United States Patent [19]

Twist et al.

[11] 4,006,080

[45] Feb. 1, 1977

[54] PROCESS FOR THE TREATMENT OF ACIDIC WASTE LIQUID CONTAINING DISSOLVED SALTS

[75] Inventors: Walter Twist, Hartlepool, England; Peter Spurgeon, Huelva, Spain

[73] Assignee: Tioxide Group Limited, Billingham, England

[22] Filed: Oct. 2, 1975

[21] Appl. No.: 619,002

[30] Foreign Application Priority Data

Oct. 12, 1974 United Kingdom ............. 44297/74
Nov. 16, 1974 United Kingdom ............. 49700/74

[52] U.S. Cl. .................................. 210/45; 210/53
[51] Int. Cl.² ........................................ C02B 1/26
[58] Field of Search ............................. 210/45–47, 210/53

[56] References Cited

UNITED STATES PATENTS 1,310,382  7/1919  Auld et al. ........................... 210/45
3,800,024  3/1974  Forsell et al. ....................... 210/45

FOREIGN PATENTS OR APPLICATIONS 47-22897  9/1972  Japan ................................. 210/45
293,763   1/1971  U.S.S.R. .............................. 210/42

*Primary Examiner*—Thomas G. Wyse
*Attorney, Agent, or Firm*—Schuyler, Birch, Swindler, McKie & Beckett

[57] ABSTRACT

A process for the treatment of aqueous sulphuric acid solutions of a metal salt or salts containing ferrous sulphates wherein the pH value of the solution is adjusted by the addition of a calcium compound to selectively precipitate calcium sulphate after which the precipitated calcium sulphate is separated and calcined before adjusting the pH of the mother liquor to a value in the range 7 to 9 by the addition of a calcium-containing compound to precipitate there from solid metal compounds which are then separated and/or calcined.

10 Claims, No Drawings

PROCESS FOR THE TREATMENT OF ACIDIC WASTE LIQUID CONTAINING DISSOLVED SALTS

The present invention relates to a process for the treatment of aqueous sulphuric acid containing dissolved metal salts.

Impure aqueous sulphuric acid solutions containing, particularly, iron sulphates wherein the iron content is substantially wholly in the ferrous state, are produced in large quantities by the steel industry (as "pickling liquor") and by the titanium dioxide industry in the operation of the so-called 'sulphate' process.

In the latter case the solution also contains smaller quantities of other metal salts, normally the sulphates, derived from impurities in the starting material for the process e.g. ilmenite or an iron-containing titaniferous slag produced by the electro smelting of ilmenite. Examples of such salts are aluminium and magnesium sulphates.

It is desirable that such aqueous sulphuric acid solutions should be treated to reduce their acidity and to remove at least the greater part of the dissolved salts in the form of a solid which can be disposed of, for example as land fill and/or as a starting material or component for other processes. It is an object of the present invention to provide such a process.

Accordingly, the present invention is a process for the treatment of an aqueous sulphuric acid solution of a metal salt or salts comprising the following steps:

a. adjusting the pH value of the solution by the addition of a calcium compound to precipitate selectively calcium sulphate;

b. separating the precipitated calcium sulphate and calcining it to form calcium sulphide and/or calcium oxide;

c. adjusting the pH of the mother liquor from (b) above to a value in the range 7 to 9 by the addition of a calcium-containing compound to precipitate solid metal compounds from the mother liquor and thereafter d. separating and/or calcining the precipitated solids from (c) above.

Adjustment of the pH in step (a) above is normally carried out to a value in the range 1 to 5.5 and particularly a value in the range 1 to 3, for example to about pH 2. This is preferably accomplished by the addition of calcium oxide, calcium sulphide or calcium carbonate. The calcium oxide or calcium sulphide may be obtained by the calcination of previously precipitated calcium sulphate which has been calcined at a temperature in the range 700° to 1350° C and particularly at a temperature in the range 1200° to 1250° C to form calcium oxide or at a temperature in the range 700° to 1150° C, particularly in the range 1000° to 1100° C to form calcium sulphide. In the latter case it is preferred that the calcined material contains less than about 5% calcium sulphate after calcination but its content of calcium oxide is not critical.

It is not, of course, necessary that all the calcium sulphate produced in step (a) should be calcined to calcium oxide or calcium sulphide. Some precipitated calcium sulphate may be utilized in other processes, for example in the production of plaster or plaster board and where this is to be done it is advisable to adjust conditions to precipitate the calcium sulphate in the particular physical form which is most useful for its intended purpose. Alternatively, some of the calcium sulphate may be calcined with other compounds, for example with the appropriate silicates to produce cement. Both processes i.e. the production of plaster, plaster board and cement are well known and have previously been described in detail.

Where calcium sulphide is utilized in step (a) hydrogen sulphide is evolved and may be recovered and used as a fuel in the calcination of calcium sulphate or it may be burned with sulphur dioxide to form elemental sulphur. In addition to the evolved $H_2S$ it may be possible to recover more $H_2S$ from the liquor by conventional stripping techniques.

As an alternative to the more conventional calcination techniques for converting calcium sulphate into calcium sulphide/calcium oxide mixtures it is understood to be possible to electrolyse calcium sulphate in an NaCl melt heated to about 740° to 800° C to produce a calcium sulphide/calcium oxide mixture together with sulphur dioxide. Such a process is described, for example, in REVUE. ROM CHEM (1967) 12 pp 985–988. The product of such a process may be used in step (a) to precipitate calcium sulphate. The sulphur dioxide from the process may be utilised in a sulphuric acid plant.

Sulphur dioxide produced by the combustion of $H_2S$, for example when the latter is used as a fuel in the calcination of calcium sulphate (together with sulphur dioxide from the conversion of calcium sulphate to calcium oxide) may also be utilised in the production of sulphuric acid or it may be burned with $H_2S$ to form elemental sulphur.

After precipitation of calcium sulphate (and, if necessary, the removal of $H_2S$) the precipitate is separated from the mother liquor by decantation, by the use of a centrifuge or by filtration and the calcium sulphate is treated as described above. Incidentally, where the material is to be calcined to calcium oxide, this is normally achieved under reducing conditions, for example in a rotary calciner or fluidised bed heated by the combustion of a fuel. The reducing conditions may be provided by the products of combustion of the fuel and/or by an added reducing agent such as carbon. The calcium sulphate prior to calcination is usually in the form of the dihydrate $CaSO_4.2H_2O$.

The pH of the mother liquor, after removal of the calcium sulphate (and $H_2S$ if necessary) is adjusted to a value in the range 7 to 9. This may be carried out by the addition of calcium oxide, calcium sulphide, calcium hydroxide or by the addition of the calcium-containing, calcined solids from step (d). As previously stated the calcium oxide, hydroxide or sulphide may be obtained by the calcination of calcium sulphate from step (a) and the formation of suitable calcined, calcium-containing solids from step (d) is described later in this specification.

The disadvantage of using calcium sulphide in the treatment of the mother liquor is that some of the metals precipitated from the mother liquor are in the form of their sulphides and/or hydroxides and these are difficult and/or unpleasant to handle and must be calcined at a relatively high temperature to give an innocuous and acceptable land fill. It is preferred, therefore, to utilise calcium oxide and/or calcium hydroxide or calcined, calcium-containing solids in step (c) since these precipitate calcium sulphate and the oxides/hydroxides (as opposed to the sulphides) of the other metals and such a mixture may require calcination only at a relatively low temperature to produce a dry handleable and acceptable solid. Calcination at a temperature in the range of about 650° to 750° C, preferably under oxidising conditions, has been found to be very suitable if the calcium sulphate content is to remain unchanged.

The calcium sulphate which is precipitated with the sulphides, oxides and/or hydroxides in step (c) assists in providing a more readily filterable product.

If it is desired to convert all the precipitate, including the calcium sulphate, to the corresponding oxides, it is normally necessary to calcine to a temperature in the range 1150° to 1350° C and preferably at one in the range 1200° to 1250° C and suitably under reducing conditions, as previously described. The sulphur dioxide, formed may, as before, be utilised in the production of sulphuric acid and/or in the production of sulphur.

The final, relatively inert solid from the calcination of the precipitate from the mother liquor may be used as land fill; in cement production or it may be used, at least in part, to neutralise the mother liquor from the initial precipitation of calcium sulphate i.e. in step (c). It is, of course, preferred to utilise material which has been converted substantially completely to the corresponding metal oxides by calcination for neutralisation of the mother liquor for this purpose.

The purpose of the present invention is to convert a strongly acidic solution of metal salts (which is extremely difficult to dispose of) into a relatively pure and innocuous liquid which can be discharged into any receiving water without difficulty and a relatively inert solid which can be used for land fill or which can be utilised as a raw material for other processes. In particular, a combination of all three possibilities provides a most attractive method of dealing with a difficult problem.

The following Examples show embodiments of the present invention.

EXAMPLE 1

The pH value of an aqueous sulphuric acid solution of ferrous sulphate (also containing smaller quantities of other dissolved metal sulphates) obtained as an effluent from the "sulphate" process for the production of titanium dioxide was adjusted to 2 and the mixture was stirred for some time before allowing the precipitate (consisting mainly of calcium sulphate) to settle. This precipitate was filtered off, dried, ground and mixed with about 12% by weight of finely divided coke (30 to 18 BSS). The mixture was then supplied to a fluidised bed of inert particulate material which was heated to, and maintained at, a temperature of 1200° C.

After a period of about 2 hours 98.5% of the calcium sulphate had been converted to calcium oxide containing less than 0.5% of calcium sulphide.

The pH value of the mother liquor obtained after filtering off the calcium sulphate as described previously was adjusted to about 8 by the addition of calcium oxide derived from the previous step and the mixture was stirred. A coloured precipitate formed which was allowed to settle before recovery by filtration. The mixture of metal hydroxides, oxides and calcium sulphate obtained by filtration was dried, ground, mixed with coke and treated in a heated fluidised bed, as previously described. The bed temperature was maintained at 1250° C throughout by means of the hot combustion products from an oil burner. The product was a dry lightly-coloured inert solid consisting of metal oxides which was very suitable for handling e.g. for dumping on land.

In both the foregoing steps i.e. during the calcination of the calcium sulphate obtained from the first pH adjustment and of the mixture from the second pH adjustment, sulphur dioxide was evolved from the fluidised bed and this could readily have been recovered and utilised as a feed material for the production of sulphuric acid.

The mother liquor from the second adjustment of the pH value was relatively pure water and was of suitable quality for discharge into receiving waters without detrimental effect.

EXAMPLE 2

An aqueous sulphuric acid solution of metal salts containing sulphuric acid, iron sulphate and other metal sulphates including those of aluminium and magnesium and similar in all respects to the effluent from a sulphate process for the production of $TiO_2$ was taken and to this was added an aqueous slurry of calcium sulphide and calcium oxide (molar ratio 1.5:0.5) until the pH value was about 1.5.

A white precipitate of calcium sulphate formed which was filtered off, washed and recovered. Hydrogen sulphide was briskly evolved and was also recovered. The precipitate was calcined at about 1075° C as described in Example 1 to produce a mixture of calcium sulphide and calcium oxide suitable for addition to more effluent solution. Some of the heat required for this calcination was obtained by the combustion of the recovered hydrogen sulphide.

To the mother liquor (and washings) remaining after the recovery of calcium sulphate was added an aqueous slurry of calcium sulphide and calcium oxide (in a molar ratio 1.5:0.5) until the pH value rose to 8.5. Hydrogen sulphide was evolved, recovered and reused as previously described. The precipitate was black but tended to become browner on standing. The precipitate was filtered off, washed and calcined at 700° C under oxidising conditions to produce a relatively inert and innocuous mixture of calcium sulphate and metal oxides suitable, for example as land fill. The sulphur dioxide evolved during the calcination was suitable for recycle, for example to a sulphuric acid plant.

The mother liquor (and washings) was a relatively pure liquor suitable for discharge to any receiving waters.

EXAMPLE 3

The process described in Example 2 was repeated to the formation of the mother liquor after the precipitation of calcium sulphate at pH 1.5 and the removal of the calcium sulphate (for calcination).

The pH value of the mother liquor (and washings) was adjusted to 8.5. by the addition of an aqueous slurry of lime with stirring. A light coloured precipitate was formed consisting of a mixture of calcium sulphate (as gypsum) and the hydroxides/oxides of other metals such as aluminium and magnesium which are precipitated under these conditions. It was necessary only to calcine this at about 150° C to form an easily handleable solid for disposal. Calcination at higher temperatures was unnecessary since there were no metal sulphides to decompose.

The dried material was an innocuous, relatively inert solid suitable as land fill and the mother liquor was a relatively pure aqueous liquid at an approximately neutral pH value suitable for discharge into any receiving water.

What is claimed is:

1. A process for the treatment of an aqueous sulphuric acid solution of a metal salt, said solution containing dissolved iron which is substantially wholly in the ferrous state, comprising the following steps:
   a. adjusting the pH value of the solution to one in the range 1 to 3 by the addition of a calcium compound to precipitate selectively calcium sulphate
   b. separating the precipitated calcium sulphate and calcining it to form a compound selected from the group consisting of calcium sulphide and calcium oxide
   c. adjusting the pH value of the mother liquor from (b) above to a value in the range 7 to 9 by the addition of a calcium-containing compound to precipitate solid metal-containing compound from the mother liquor and thereafter
   d. separating and calcining the precipitated solids from (c) above.

2. A process as claimed in claim 1 wherein the precipitated calcium sulphate from step (a) is calcined at a temperature in the range 700° to 1350° C.

3. A process as claimed in claim 2 wherein the calcium sulphate is calcined at a temperature in the range 1200° to 1250° C.

4. A process as claimed in claim 2 wherein the calcium sulphate is calcined at a temperature in the range 700° to 1150° C.

5. A process as claimed in claim 1 wherein the calcium-containing compound of step (c) is selected from the group consisting of calcium sulphide, calcium oxide, calcium hydroxide and the product from step (d).

6. A process as claimed in claim 1 wherein the calcination step in (d) is by heating to a temperature in the range 650° to 750° C.

7. A process as claimed in claim 1 wherein the solids in step (d) are calcined under oxidising conditions.

8. A process as claimed in claim 1 wherein the calcination in step (d) is carried out at a temperature in the range 1150° to 1350° C under reducing conditions.

9. The process of claim 1 wherein said aqueous sulphuric acid solution of a metal salt is an effluent from the sulphate process for the production of titanium dioxide.

10. The process of claim 1 wherein said aqueous sulphuric acid solution of a metal salt is pickling liquor produced by the steel industry.

* * * * *